US012353438B2

(12) United States Patent
Christensen et al.

(10) Patent No.: US 12,353,438 B2
(45) Date of Patent: *Jul. 8, 2025

(54) INSTRUCTIVE ACTIONS BASED ON CATEGORIZATION OF INPUT DATA

(71) Applicant: Micron Technology, Inc., Boise, ID (US)

(72) Inventors: Carla L. Christensen, Boise, ID (US); Lavanya Sriram, Boise, ID (US); Swetha Barkam, Meridian, ID (US); Anshika Sharma, Boise, ID (US); Libo Wang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,976

(22) Filed: Dec. 21, 2023

(65) Prior Publication Data
US 2024/0143631 A1    May 2, 2024

Related U.S. Application Data

(63) Continuation of application No. 17/006,684, filed on Aug. 28, 2020, now Pat. No. 11,874,852.

(51) Int. Cl.
G06F 17/00         (2019.01)
G06F 16/28         (2019.01)
(Continued)

(52) U.S. Cl.
CPC ........ *G06F 16/285* (2019.01); *G06F 21/6245* (2013.01); *G06N 5/04* (2013.01); *G06N 20/00* (2019.01)

(58) Field of Classification Search
CPC .............. G06F 16/285; G06F 21/6245; G06F 13/1668; G06N 5/04; G06N 20/00; H04W 4/38
See application file for complete search history.

(56) References Cited

U.S. PATENT DOCUMENTS 9,852,601 B1   12/2017  Auvenshine
10,424,412 B2   9/2019  Huang
(Continued)

OTHER PUBLICATIONS

Kurian Karyakulam et al., Enhancing Support for Machine Learning and Edge Computing on an IoT Data Marketplace. In Proceedings of the First International Workshop on Challenges in Artificial Intelligence and Machine Learning for In Internet of Things, Association for Computing Machinery,Nov. 19-24 (Year: 2019).*

*Primary Examiner* — Greta L Robinson
(74) *Attorney, Agent, or Firm* — Brooks, Cameron & Huebsch, PLLC

(57) ABSTRACT

Systems, devices, and methods related to generating instructive actions based on categorization of input data are described. In an example, a method can include receiving, from an edge device and at a processing resource of a device, a plurality of input data associated with a plurality of sources communicatively coupled to the edge device and categorizing each piece of the plurality of input data as private or public based on an associated one of the plurality of sources. The categorizing can include writing each piece of data with metadata that indicates that it is private or public and/or selecting a first data path indicated as private or a second data path indicated as public. The method can include writing each piece of the plurality of input data categorized as private to a dedicated buffer or a dedicated address space of a memory resource.

20 Claims, 4 Drawing Sheets

(51) Int. Cl.
    *G06F 21/62*           (2013.01)
    *G06N 5/04*            (2023.01)
    *G06N 20/00*          (2019.01)

(56)          References Cited

U.S. PATENT DOCUMENTS

| | | |
|---|---|---|
| 10,691,829 B2 | 6/2020 | Mandal et al. |
| 10,730,181 B1 | 8/2020 | Rajkumar et al. |
| 10,735,470 B2 | 8/2020 | Vidas et al. |
| 11,147,459 B2 | 10/2021 | Sobol |
| 11,367,532 B2 | 6/2022 | Hoar et al. |
| 11,461,216 B1 | 10/2022 | Jain |
| 11,874,852 B2 * | 1/2024 | Christensen ........ G06F 21/6245 |
| 2002/0188589 A1 | 12/2002 | Salmenkaita |
| 2003/0154375 A1 | 8/2003 | Yang |
| 2007/0204224 A1 | 8/2007 | Kenagy |
| 2008/0052759 A1 | 2/2008 | Kronlund |
| 2013/0204996 A1 | 8/2013 | Takazawa |
| 2016/0149862 A1 | 5/2016 | Kilgallon |
| 2016/0283738 A1 | 9/2016 | Wang |
| 2018/0025287 A1 | 1/2018 | Mathew |
| 2018/0082073 A1 | 3/2018 | Trachy |
| 2018/0082079 A1 | 3/2018 | Burckard |
| 2018/0150650 A1 | 5/2018 | Saunders |
| 2018/0218124 A1 | 8/2018 | Gorelick |
| 2018/0232534 A1 | 8/2018 | Dotan-Cohen |
| 2020/0153800 A1 | 5/2020 | Erden |
| 2020/0225901 A1 | 7/2020 | Boissiere |

\* cited by examiner

INSTRUCTIVE ACTIONS BASED ON CATEGORIZATION OF INPUT DATA

PRIORITY INFORMATION

This application is a continuation of U.S. application Ser. No. 17/006,684, filed on Aug. 28, 2020, the contents of which are incorporated herein by references.

TECHNICAL FIELD

The present disclosure relates generally to semiconductor memory and methods, and more particularly, to methods, devices, and systems related to transmitting instructive actions based on categorization of input data as public or private.

The present disclosure relates generally to semiconductor memory and methods, and more particularly, to methods, devices, and systems related to transmitting instructive actions based on categorization of input data as public or private.

BACKGROUND

Memory resources are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random access memory (DRAM), static random access memory (SRAM), synchronous dynamic random access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random access memory (RRAM), ferroelectric random access memory (FeRAM), and magnetoresistive random access memory (MRAM), such as spin torque transfer random access memory (STT RAM), among other types.

Electronic systems often include a number of processing resources (e.g., one or more processing resources), which may retrieve instructions from a suitable location and execute the instructions and/or store results of the executed instructions to a suitable location (e.g., the memory resources). A processing resource can include a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., NOT) logical operations on data (e.g., one or more operands). For example, functional unit circuitry may be used to perform arithmetic operations such as addition, subtraction, multiplication, and division on operands via a number of operations.

Devices (e.g. edge device, computing device, etc.) can receive input data via sensors. As referred herein, the term "sensor" can be a device and/or a subsystem of a device that responds to a physical stimulus (e.g., heat, light, sound, pressure, magnetism, or a particular motion) and transmits a resulting impulse as for measurement or operating a control. Sensors can include temperature sensors, heat sensors, movement sensors, biosensors, infrared illuminator, etc. Memory can be used heavily in connection with such sensors in edge devices and other devices receiving input data via such sensors.

DETAILED DESCRIPTION

Figure 1:
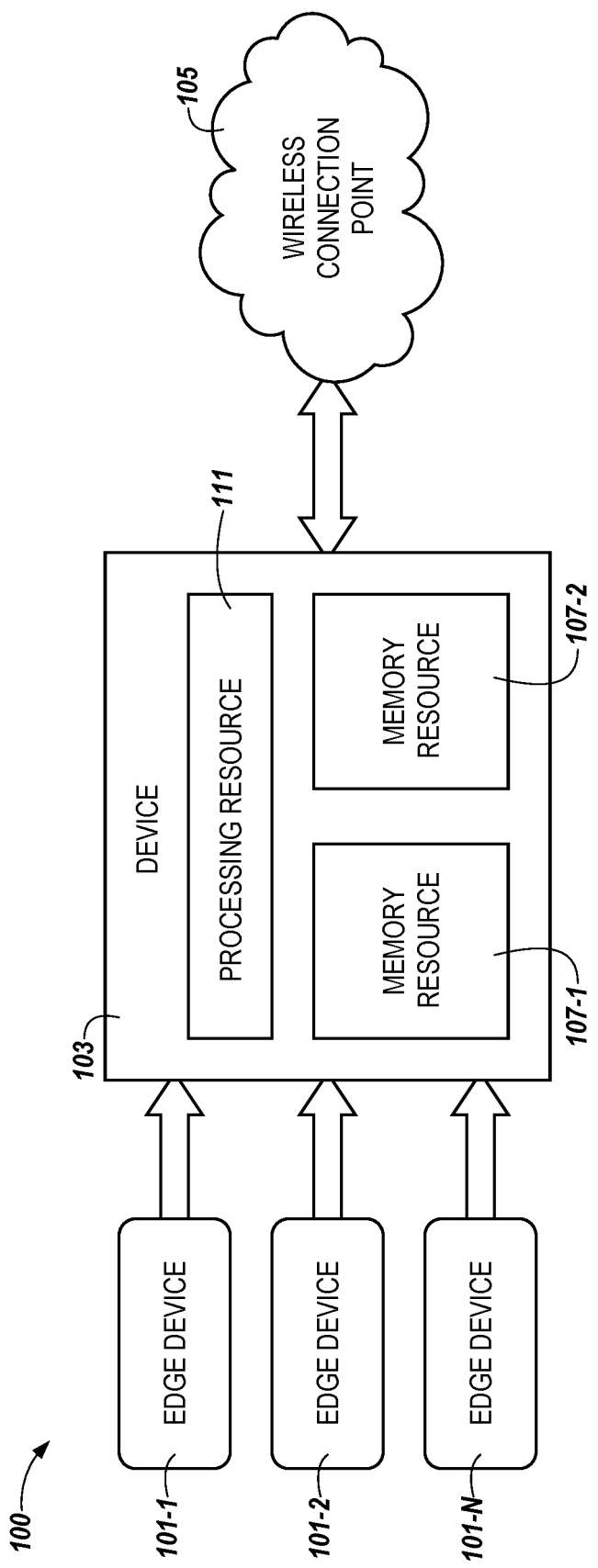
FIG. 1 illustrates a system diagram representing wirelessly sharing of input data to transmit an instructive action based on categorization of input data as public or private data between edge devices, a device and a wireless connection point in accordance with a number of embodiments of the present disclosure.

The present disclosure includes methods, devices, and systems related to transmitting instructive actions to a user and/or a device based on categorization of a plurality of input data as public or private. Input data can include data input into/received at a device and may include data associated with a user such as a user's height, weight, heart rate, temperature, calorie burn rate, sleep pattern, location, etc., for example. Input data can be received via a plurality of sensors communicatively coupled to device. In some examples, the device can be a computing device, an edge device, etc.

As used herein, the term edge device refers to a hardware that can control data flow at the boundary between two networks. For example, an edge device can control input data via a sensor and a computing device. In some examples, the computing device can receive the input data from the edge device and store the input data and/or transmit the input data to a wireless connection point. The stored input data can be used for data mining and to monitor activities of a user. The activities can include, for instance, deviations from regular routine activities of the user (e.g., getting less than ten thousand steps per day).

In some examples, an edge device can send an alert to the user to change behavior for improved health (e.g., establish optimal sleep patterns, promote user to move if idle for too long, hit target heart rate when exercising, etc.). Memory in the edge device, the computing device, and/or the wireless connection point may receive, store, and instruct a processing resource to perform artificial intelligence (AI) operations on the input data, as further described herein. As used herein, AI refers to a machine (e.g., computing device) dealing with the simulation of intelligent behavior in computing devices.

According to a number of embodiments, a plurality of input data may be received from an edge device (e.g., smart appliances, activity trackers, smart watches, smart mirrors, etc.) and at a processing resource of another device (e.g., computing device). The plurality of input data may be associated with a plurality of sources (sensors, manually entered data, etc.) communicatively coupled to the edge device. As used herein, "communicatively coupled" can include coupled via various wired and/or wireless connections between devices for access to and/or for movement (transmission) of instructions (e.g., control signals, address signals, etc.) and data, as appropriate to the context. The coupling need not be a direct connection, and in some examples, can be an indirect connection.

Each piece of the plurality of input data received can be categorized as private data or public data based on associated one of the plurality of sources. As used herein, the term "private data" refers to input data that can be received automatically from a source and can be reasonably expected to be secured from public view. Contrarily, the term "public data" can refer to manually entered input data that can be used, reused, and redistributed with no existing restrictions on access and/or usage. The categorizing can include writing each piece of data with metadata that indicates that it is private or public or selecting a first data path indicated as private or a second data path indicated as public, or both.

The input data categorized as private or public input data can be received at the processing resource of a device and used to perform AI operations to identify and categorize each piece of the plurality of input data as private or public data. In some examples, AI operations can be performed in a processing resource of a wireless connection point (e.g., cloud). The AI operations may include machine learning or neural network operations, which may include training operations or inference operations, or both.

In some embodiments, the categorization of each piece of the plurality of input data can determine the source of the input data and further generate executable instruction for the device and/or instructive action for the user. For example, a system can determine the source of a first piece of the input data being a sensor of a smart watch. Based on the categorization, the system can categorize the first piece of the input data as private data and send an instructive action for the user of the smart watch. Keeping the data as private data can help protect the user's personal data being shared externally and from being breached. Additionally, keeping the data private can help comply with regulatory guidelines and government requirements.

Similarly, the system can determine the source of a second piece of the input data being manually entered and can categorize the second piece of the input data as public data. Based on the categorizations, the system can generate an instructive action to transmit the second piece of input data to a wireless connection point (e.g., computing device, cloud etc.). Making a portion of the received input data public can help find natural patterns in data that can generate insight and help make better decisions and predictions, using a machine learning algorithm. For instance, the machine learning algorithm can include a model based on sample data (e.g., training data) to make the improved decisions and predictions.

The plurality of received input data may be written to a dedicated buffer or dedicated address space of a memory resource associated with the device and/or a memory associated with a wireless connection point. A processing resource of the device or the wireless connection point can have access to the plurality of input data stored in one particular or a plurality of memory resources. At least one accessible memory resource may also store an AI algorithm (e.g., a machine learning algorithm) used to analyze and operate on each piece of the categorized input data and stored in a memory resource. The processing resource can be configured to execute instructions stored on the one or more accessible memory resources.

The memory resource can include multiple types of memory media (e.g., volatile and/or non-volatile) and can write data to the various memory resources. The data inputs that can be written to memory media can vary based on characteristics such as source, attributes, metadata, and/or information included in the data. Data inputs received by a memory resource can be written (e.g., stored) in a particular type of memory media based on attributes. For instance, a particular memory media type can be selected from multiple tiers of memory resources based on characteristics of the memory media type and the attributes of the data input. Characteristics of the memory media type can include volatility, non-volatility, power usage, read/write latency, footprint, resource usage, and/or cost.

For example, non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such PCRAM three-dimensional cross-point memory (e.g., RRAM, FeRAM, MRAM and programmable conductive memory, among other types of memory. Volatile memory can require power to maintain its data (e.g., host data, error data, etc.) and includes RAM, DRAM, and SRAM, among others. The characteristics of different memory resources can include features that cause tradeoffs related to performance, storage density, energy requirements read/write speed, cost, etc. In some examples, some memory resources may be faster to read/write but less cost effective than other memory resources. In other examples, memory resources may be faster but consume a large amount of power and reduce the life of a battery, other memory media types can be slower and consume less power.

As hosts such as mobile devices, semi-autonomous vehicles, fully autonomous vehicles, mobile artificial intelligence systems, etc. become more prevalent, sensors and other devices related to computing systems and hosts are also increasingly prevalent. The sensors can produce frequent and/or large quantities of input data which can be used by a computing system, an edge device, and/or a user interface corresponding to the edge device. Balancing the tradeoffs between various different memory media types to store the frequent and/or large quantities of data can be an important endeavor.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory resources) can refer to one or more memory resources, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context and, unless stated otherwise, can include a wireless connection point. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 103 can reference element "03" in FIG. 1, and a similar element can be referenced as 303 in FIG. 3. A group or plurality of similar elements or components can generally be referred to herein with a single element number. For example, a plurality of reference elements 101-1, 101-2 . . . 101-N can be referred to generally as 101. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 illustrates a system diagram 100 representing wirelessly sharing of input data to transmit instructive actions based on categorization of input data as public or private data between edge devices 101-1, 101-2 . . . 101-N, a device 103, and a wireless connection point 105 in accordance with a number of embodiments of the present disclosure. In some examples, the plurality of edge devices 101-1, 101-2, . . . 101-N may be referred to collectively and/or independently as "edge device(s) 101".

FIG. 1 illustrates a device 103 such as a computing device receiving from the edge device 101 and at a processing resource 111 of the device 103, a plurality of input data. As used herein, a computing device is a mechanical or electrical device that transmits or modifies energy to perform or assist in the performance of human tasks. Examples include thin clients, personal computing device, printing devices, laptops, mobile devices (e.g., e-readers, tablets, smartphones, etc.), hub devices, internet-of-things (IoT) enabled devices, and gaming consoles, among others.

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, smart home devices, monitoring devices, wearable devices, devices enabling intelligent shopping systems, among other cyber-physical systems.

Each piece of the input data can be associated with a plurality of sources communicatively coupled to the edge device 101. For example, edge device 101-1 can be coupled to a sensor, the edge device 101-2 can be receive input data entered manually, etc. The device 103, in some examples, can include memory resources 107-1 and 107-2 communicatively coupled to the processing resource 111 to store secure edge device data (e.g., private data) and edge device data approved for external sharing (e.g., public data), respectively.

In some embodiments, a piece of input data received can be categorized as public data or private date based on a source of the data. For example, a first piece of input data (e.g., heart rate) can be received automatically from a sensor communicatively coupled to the edge device 101-1 (e.g., a smart watch). As used herein, the term "automatically" refers to an action by a device or process without human intervention. Put another way, "automatically" can include an action performed with limited or no user input and/or with limited or no prompting. For example, the sensor communicatively coupled to the edge device 101 can be configured to detect changes in the environment and/or the physiological change in the user of the edge device 101 and transmit a command to the edge device without human intervention. In some examples, an instructive action can be sent to the edge device 101-1 to alert the user (e.g., automatically). For instance, the processing resource 111 can instruct the edge device 101-2 to generate the alert responsive to the detected change or changes. In an example, a user can receive an alert and/or a notification if the user's heart rate reaches a threshold beats per minute (BPM) (e.g., above or below a chosen BPM), or to occasionally check for an irregular heart rhythm.

Based on the source being a sensor, the first piece of input data can be categorized as private data. The categorization can include the first piece of input data being written with metadata that indicates that it is private, selecting a first data path indicated as private, or both. For instance, the metadata provides information about the input data, and the selected path can include secured, unsecured, etc.

In some embodiments, a piece of input data received can be categorized as public data. For example, a second piece of input data (e.g., a generic workout plan) can be manually entered input data. Based on the determination that the input data was manually entered; the second piece of input data can be categorized as public data. The categorization can include the second piece of input data being written with metadata that indicates that it is public, selecting a second data path indicated as public, or both. For instance, the metadata provides information about the input data, and the selected path can include secured, unsecured, etc. The second piece of the input data can be received at a processing resource 111 of the device 103 and/or a processing resource (not illustrated) of the wireless connection point 105.

The categorized input data can be received at a processing resource 111 of the device 103. In some examples, the received input data categorized as private data can be written to the memory resource 107-1 of the device 103 as secured edge device data. In some examples, each piece of the received input data can be initially written as secured edge device data in the memory resource 107-1 of the device 103 regardless of the source it was received from. The device 103 can further verify, using a machine learning algorithm, if each piece of the plurality of input data is private. In determining that the input data is private data, the input data remains as secured edge device data. The device 103 can use the machine learning algorithm and generate an instructive action to the edge device based on output of the machine learning algorithm.

In some embodiments, if each piece of the plurality of input data is determined to be public (e.g., watch time), the input data may be approved for external sharing. For example, the public data may be written to the memory resource 107-2, can be accessed by the processing resource 111, and can be transmitted to the wireless connection point 105. The wireless connection point 105 can use a machine learning algorithm to analyze, compare, predict, and to generate executable instructions for the device. In some examples, the wireless connection point 105 can use the machine learning algorithm to generate and transmit instructive actions for the edge device to alert/notify a user.

The wireless connection point 105 can include a cloud computing service, (e.g., Infrastructure as a Service, Platform as a Service, Software as a Service, Function as a Service, etc.). In some examples, the wireless connection point 105 can include a satellite wireless service satellite internet connection accessible for retrieving internet content and/or information, a carrier network located onsite and/or at a remote location, or a combination thereof.

In a number of embodiments, the wireless connection point 105 can be a cloud computing service having a processing and memory resource which may be wirelessly connected to a processing resource 111 and a memory resource 107 of the device 103, and/or a processing resource and memory resource of the edge device 101. The processing and memory resource of the wireless connection point 105 can be coupled to another wireless connection point (e.g., a base station, a computing device, etc.) having a processing resource and a memory resource. The wireless connection point 105 may include wireless network accessing resources from a third-party provider using wide area networking (WAN) or Internet-based access technologies (e.g., as opposed to wireless local area networking (WLAN)). In this example, the wireless network accessing resources can include improved Internet access and/or more reliable WAN bandwidth (e.g., suitable for using 5G wireless technology) which may enable processing of network management functions in the wireless connection point 105.

In some examples, the wireless connection point 105 may be wirelessly coupled, for instance using a fifth generation (5G) connection, to a wireless technology. 5G may be designed to utilize a higher frequency portion of the wireless spectrum, operating in millimeter wave bands (e.g., 28, 38, and/or 60 gigahertz), compared to other wireless communication technologies (e.g., fourth generation (4G) and previous generations, among other technologies). The millimeter wave bands of 5G may enable data to be transferred more rapidly than technologies using lower frequency bands. For example, a 5G network is estimated to have transfer speeds up to hundreds of times faster than a 4G network, which may enable data transfer rates in a range of tens of megabits per second (MB/s) to tens of GB/s for tens of thousands of users at a time (e.g., in a shared memory resource on the wireless connection point 105) by providing a high bandwidth. The actual size of the shared memory resource, along with the corresponding bandwidth, may be scalable dependent upon the number of input data included in the shared memory resource, among other considerations described herein.

In some embodiments, a machine learning algorithm operation, such as an advanced machine learning algorithm programmed to receive, categorize, predict and generate instructive actions may be stored in one or more memory resources associated with the wireless connection point 105, and can be executed by one or more processing resources associated with the wireless connection point 105. The execution of the machine learning algorithms to operate on the categorized input data may be performed in a distributed computing environment, but embodiments are not so limited. In some embodiments, at least a portion of available machine learning algorithms may be stored in one or more memory resources executed by one or more processing resources associated with the edge device 101, the device 103, and/or the wireless connection point 105. Embodiments, however, are not limited to these examples. A plurality of memory resource types (e.g., DRAM, SCM, and NAND) may be associated with the processing resources to receive data from the edge devices 101.

The device 103 and the wireless connection point 105 can receive input data from a source and operate on the received input data using a machine learning algorithm. For example, the device 105 may receive private data from an edge device 101-2 about a user's blood pressure (e.g., high blood pressure). In such an example, the machine learning algorithm may generate an instructive action to recommend the user follow a low intensity workout and/or slow down or stop doing a current activity. In some examples, the instructive action may be predictive based on activities of the user at different periods of time. For instance, heartbeats per minute may be collected at different periods of time and compared.

A predictive action can be determined by comparing the input data in current time with input data received at different time period. In some examples, the private data received in a first time period can be compared with the private data received in a second time period and a predictive action can be determined for the user based on the comparison. For example, during a first time period an input data received can be a decrease in workout intensity in response to a user's heart rate reaching above a threshold BPM value. For the same user, during a second time period an input data receive can include an increase in workout intensity in response to the user's heart rate dropping below a threshold BPM value. Based on that, the machine learning algorithm may predict the user's optimal workout intensity.

In some examples, the device 103-1 may determine that the input data is received for the first time. In such instances, the machine learning algorithm may generate an instructive action to send an alert or suggest an alternative plan based on users with a similar physical condition (e.g., high blood pressure).

In some examples, the device 103, the edge device 101, and the wireless connection point 105 can include a system motherboard and/or backplane and can include a number of memory access devices and a number of processing devices (e.g., one or more processing resources, microprocessing resources, or some other type of controlling circuitry). One of ordinary skill in the art will appreciate that "a processing resource" can intend one or more processing resources in the form of transistors, Application Specific Integrated Circuits (ASICs), logic gates, etc. (all of which may also be referred to as "processing devices"). Processing resources can also include a parallel processing system having a plurality of processing devices operating together in an organized, structured manner as a number of coprocessing resources, etc.

Figure 2:
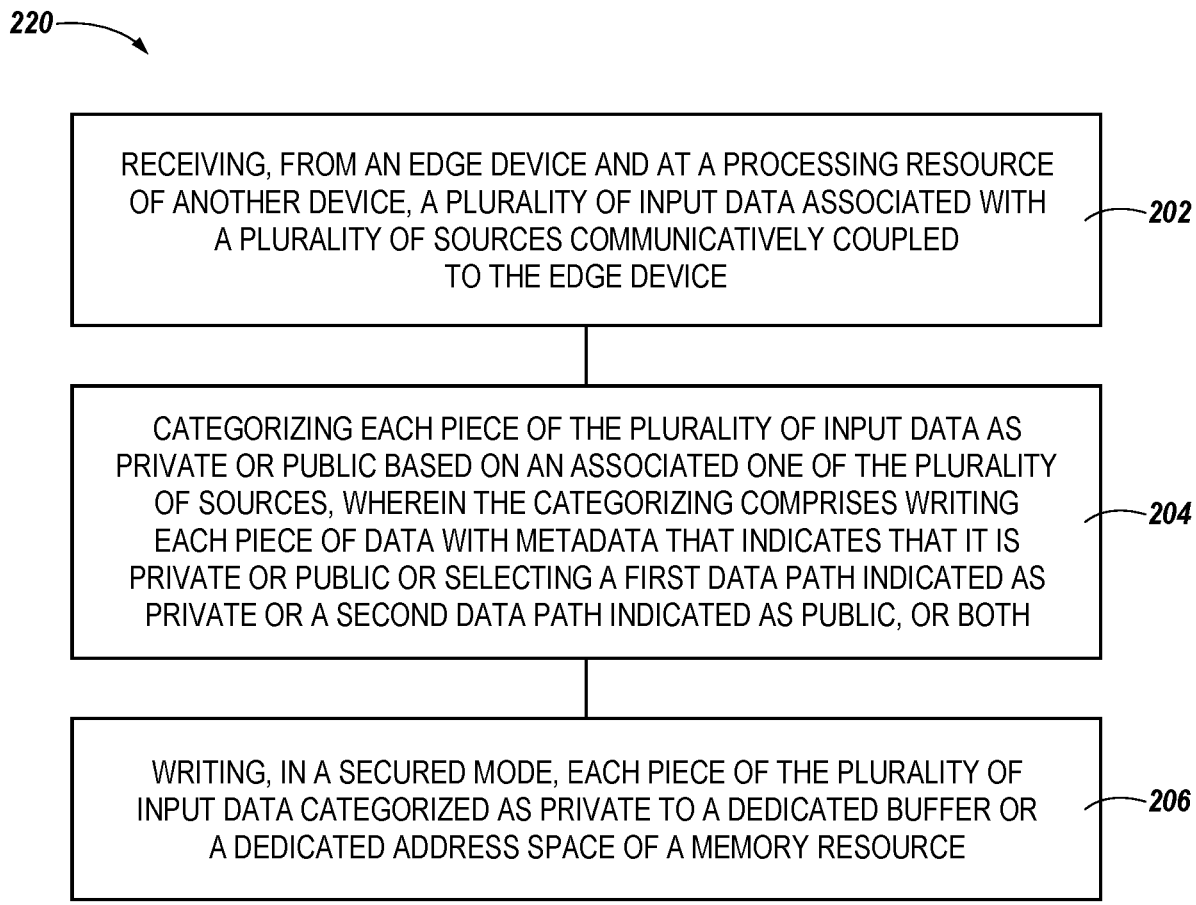
FIG. 2 illustrates a flow diagram representing an example method of transmitting an instructive action based on categorization of input data as public or private in accordance with a number of embodiments of the present disclosure.

FIG. 2 illustrates a flow diagram representing an example method 220 of transmitting an instructive action based on categorization of input data as public or private in accordance with a number of embodiments of the present disclosure. At block 202, the method 220 can include receiving, from an edge device and at a processing resource of another device (e.g., a computing device such as device 103 as illustrated in FIG. 1), a plurality of input data associated with a plurality of sources communicatively coupled to the edge device. The processing resource can be wirelessly connected to the edge device and configured to execute instructions stored on a memory resource of the device to receive a plurality of input data. A device (device 103 as illustrated in FIG. 1) can receive from an edge device (e.g., edge device 101 as illustrated in FIG. 1) a plurality of input data at the processing resource (e.g., 111 as illustrated in relation to FIG. 1) of the device. As discussed herein, the plurality of input data can be received from an edge device associated with a plurality of sources communicatively coupled to the edge device.

At block 204, the method 220 can include categorizing each piece of the plurality of input data as private or public based on an associated one of the plurality of sources. The sources of the plurality of input data can include sensors, manual entry, internal and/or external database, etc., as discussed herein. In some examples, the categorizing can include writing each piece of data with metadata that indicates that it is private or public or selecting a first data path indicated as private or a second data path indicated as public, or both.

For instance, categorizing each piece of the plurality of input data as public can be based on receiving the piece of input data as manually entered input data. For example, public data may include a generic workout, goal to reach by a certain time period (e.g., running a marathon in September). In some examples, the public data can include a portion of the private data, as further discussed herein. Public data, in some examples, can be shared externally (e.g., via a wireless connection and/or wirelessly to a wireless connection point).

Categorizing a piece of the input data as private can be based on receiving the piece of input data automatically from a sensor. For instance, temperature, muscle mass, heart rate etc. can be received automatically from a sensor communicatively coupled to an edge device (e.g., edge device 101 in FIG. 1). The private data can be written to a memory resource of the device (e.g., computing device) in a secured (e.g., encrypted) mode, for instance via a first, private data path and not shared externally. The private data can be written with metadata that can describe or give other information about the input data indicating it is private. In some examples, the input data received from a first source can be categorized in a first category (e.g. private data) and later categorized in a second category (public data input). For example, a first piece of input data can be received via a sensor communicatively coupled to the edge device and can be categorized as private data. The first piece of input data can be written to a memory resource of the device (e.g., a secure device database) of the device. In some examples, when the processing resource of the device performs a machine learning algorithm operation on the received plurality of input data, the first piece of the input data can be categorized as public data and may be approved to be shared externally.

In an example, receiving a piece of the plurality of input data can include receiving a first piece of input data (e.g., body weight), a second piece of input data (e.g., muscle mass) and a third piece of input data (e.g., generic workout plan), from an edge device at the processing resource of the device. In some examples, the first piece of the plurality of input data (e.g., body weight) and/or the second piece of input data (e.g., muscle mass) can be automatically received from a sensor communicatively coupled to the edge device. Based on being automatically received, the first and the second pieces of the plurality of input data can be categorized as private data. The private data can be saved as secure edge device data in a memory resource of the device.

In the example, receiving a piece of the plurality of input data can include receiving a manually entered input data. Based on being manually entered a piece of the plurality of input data can be categorized as public data. The public data can be written to a memory resource of the device (e.g., via a second, public data path). The data can be written with metadata that can describe or give other information about the input data indicating it is public. For instance, the third piece of input data (e.g., generic workout plan) can be manually entered and can be categorized as public data and written to the memory resource 107-2 as described in FIG. 1.

In some embodiments, public data can include a portion of the private data based on a security tag associated with the portion of the private data. As used herein, the term security tag refers data classification of input data to determine where data can and cannot go. The portion of the private data may not be shared externally. For example, the public data about a user can include manually entered health input data about a user. A portion of the manually entered input data, however, may be tagged as private data (example, BMI, weight, age, etc.) and may not be authorized to be shared externally.

At 206, the method 220 can include writing, in a secured mode, each piece of the plurality of input data categorized as private to a dedicated buffer or a dedicated address space of a memory resource. For instance, the dedicated buffer or dedicated address space may be a public or private repository, where input data may be stored based on its categorization. For instance, the processing resource may provide the private data to the dedicated buffer or dedicated address space. The location can include a portion, such as a portion of a memory resource (e.g., secure database 107-1) of the device (e.g., device 103 as illustrated in connection to FIG. 1). The private data can be written in a secured mode and not shared externally. In some examples, the private data may be operated upon using machine learning algorithm stored in the memory of the device and accessible by the processing resource of the device. The machine learning algorithm operated-on information may be used to generate and transmit instructive actions to the edge device.

In some examples, the location can be a wireless connection point. The machine learning algorithm stored in the memory resource of the device and accessible by the processing resource of the device can determine a portion of the private data can be transmitted to a wireless connection point. For example, a plurality of input data such as an average distance run per week, weight, body fat percentage, etc., can be received automatically from a sensor communicatively coupled to the edge device at the processing resources of the device. Based on the receiving of the input data being automatic, the plurality of input data may be categorized as private. In some examples, the processing resource may transmit a portion (e.g., running distance per week) of the private data to the wireless connection point (e.g., a processing resource of the wireless connection point).

In some embodiments, instructive actions can be transmitted based on categorizations of the input data. If the input data is categorized as private data, instructive action can be transmitted to the edge device. For example, a plurality of input data about physical activity (e.g. number of steps completed) of a first user can be received during a specific time period (e.g., Monday-Friday the user completes six thousand steps by 12:00 PM). An instructive action can be transmitted to the edge device to remind the user about the physical activity during that specific time period. For example, an instructive action can include transmitting a reminder to move more to achieve step goals by 12:00 PM.

In some examples, an instructive action can be transmitted by comparing the plurality of input data received during the present time period with a time period other than the present time period. For example, a comparison can include the input data received, (e.g., number of steps taken by the user) during a first time period on day one, a second time period on day two, and a third period on day three. An instructive action can be transmitted by comparing the number of steps taken during the present time period with steps taken during the first time period, the second time period, and the third time period. In some examples, the input data associated with the present time period can be compared with the received input data average of the first, the second, and the third time periods. In some examples, the input data received at the present time period can be compared with the first time period, the second time period, and the third time period individually.

In some embodiments, the method 220 can include transmitting the public data to a wireless connection point. As described herein, public data can refer to manually entered input data that can be used, reused, and redistributed by the wireless connection point and/or the device with no existing restrictions on access and/or usage. If a piece of the plurality of input data is determined to be public data (e.g., watch time), the input data may be approved for external sharing. For example, the public data can be transmitted to a wireless connection point (e.g., wireless connection point 105 illustrated in FIG. 1). The wireless connection point can apply a machine learning algorithm to generate and transmit instructive actions for the edge device to alert/notify the user. In some example, the wireless connection point can transmit instructive actions to the device (e.g., device 103, as illustrated in FIG. 1).

Figure 3:
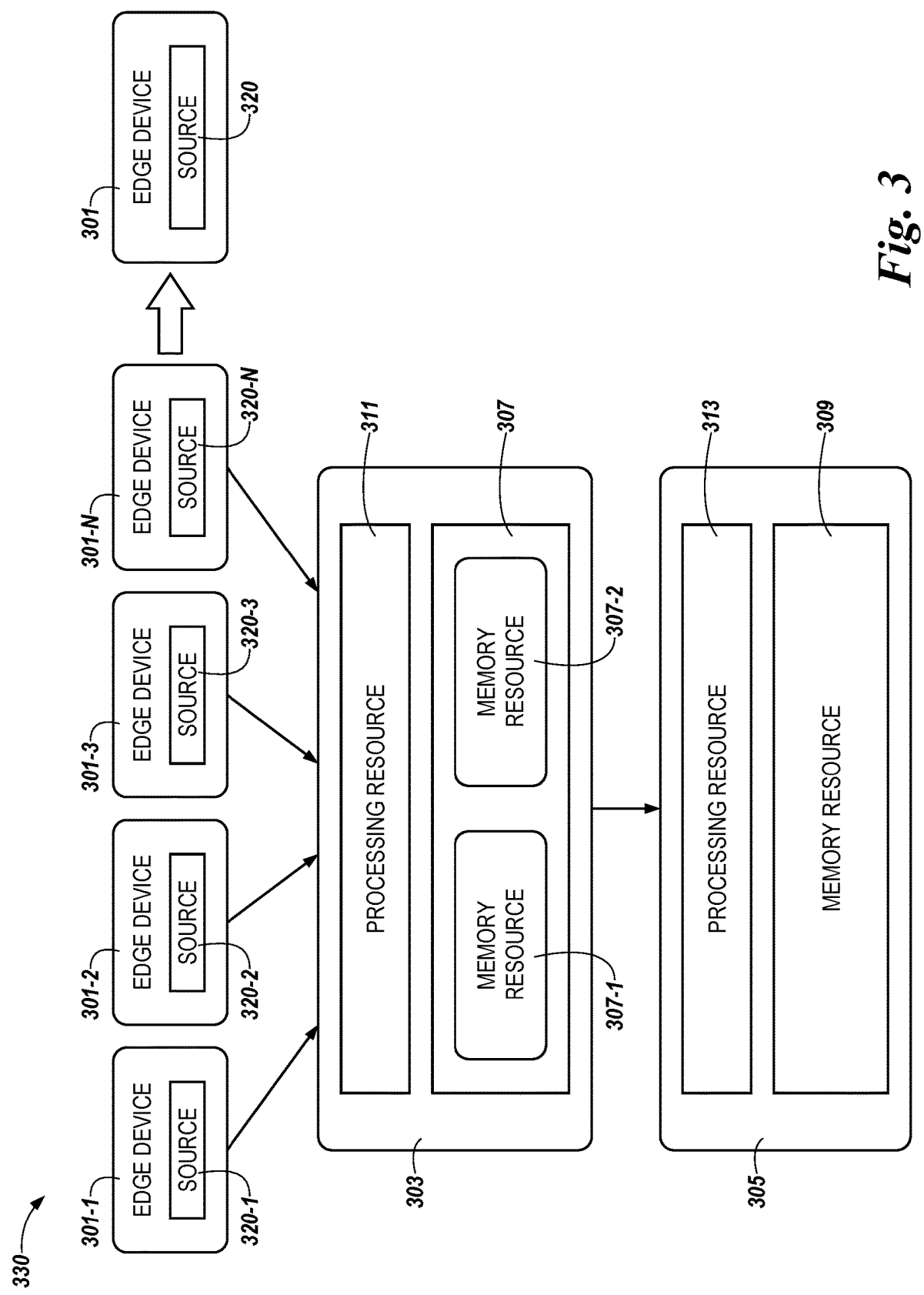
FIG. 3 illustrates a diagram of a system representing wirelessly sharing of input data to transmit an instructive action based on categorization of input data as public or private data between edge devices, a device and a wireless connection point in accordance with a number of embodiments of the present disclosure.

FIG. 3 illustrates a diagram of a system 330 representing wirelessly sharing of input data to transmit an instructive action based on categorization of input data as public or private data between edge devices 301-1, 301-2 . . . 301-N, a device 303, and a wireless connection point 305 in accordance with a number of embodiments of the present disclosure. In some examples, the plurality of edge devices 301-1, 301-2, . . . 301-N may be referred to collectively and/or independently as "edge device(s) 301".

The device 303 can include a processing resource 311 to execute instructions stored on a first memory resource 307 to categorize each piece of the plurality of input data as public or private data based on an associated one of the plurality of sources. For instance, the processing resource 311 can be configured to receive a plurality of input data from an edge device 301 or edge devices 301 associated with a plurality of sources 320 (e.g., a watch, a heart rate monitor, etc.) communicatively coupled to the edged devices 301. In some examples, the source 320 may be a sensor or a sensor of a source.

The processing resource 311 can categorize each piece of the plurality of input data as private or public based on an associated one of the plurality of sources, wherein the categorizing comprises writing each piece of data with metadata that indicates that it is private or public or selecting a first data path indicated as private or a second data path indicated as public, or both. The processing resource 311 can use the categorization to write input data to a particular one of the memory resources 307. For instance, the processing resource 311 can write each piece of the plurality of input data categorized as private to a first memory resource 307-1 communicatively coupled to the processing resource 311, the processing resource 311 can write each piece of the plurality of input data categorized as public to a second memory resource 307-2 communicatively coupled to the processing resource 311.

In some examples, the processing resource 311 can transmit to the processing resource 313 of the wireless communication device 305, at least a portion of the plurality of input data and associated metadata, as will be discussed further herein. The device 303 can further include the first memory resource 307-1 and the second memory resource 307-1 communicatively coupled to the processing resource 311 to store input data categorized as private and public, respectively. In a non-limiting example, the device 303 can receive at the processing resource 311 an input data from edge device 301. The edge device 301 can be communicatively coupled to a source 320 to receive a plurality of input data associated with a plurality of sources 320. For instance, the edge device 301-1 can be communicatively coupled to a source 320-1, which may be a sensor to receive a plurality of input data. The device 303 can receive that data at the processing resource 311. Similarly, the device 303 can receive manually entered input data from the edge device 301-2. The edge device 301-2 can be communicatively coupled to a source 320-2 (e.g., a sensor). In some examples, the edge device 301-2 may receive manually entered input data. As discussed herein, the each of the plurality of input data can be categorized as private or public data based on the source of the input data received.

The device 303 can include a private data memory resource 307-1 (e.g., a private data repository). In some examples, the edge device 301-1 can receive a plurality of input data via the source 320-1 communicatively coupled to the edge-device 301-1. Each piece of the automatically received plurality of input data can be categorized as private data. For example, the edge device 301-1 can receive a user's weight, BMI, heartrate, etc. via the sensor 320-1 communicatively coupled to the edge device 301-1 and categorize the received input as private data. The categorized private data can be stored in the memory resource 307-1, for example. The device 303 can, using a machine learning algorithm to determine and transmit an instructive action to the edge device 301-1 based on the received private data.

In some embodiments, the first processing resource 311 is configured to execute instructions stored on the first memory resource 307 to selectably determine the predictive action of the user by comparing the private data in a current time with input data received at different time period. For example, the private data received in a first time period can be compared with the private data received in a second time period and a predictive action can be determined for the user based on the comparison.

In some embodiments, the device 303 can include a public data memory resource 307-2 (e.g., a public data repository). In some examples, when the edge device 301-1 receives a plurality of input data by manual entry, each piece of input data can be categorized as public data. The public data can be stored in the memory resource 307-2, for example. The public data in the memory resource 307-2 can be shared externally. The device 303 can, using machine learning algorithm, determine and transmit an instructive action to the edge device 301-1 based on the received public data. In some examples, the device 303 can share the public data to wireless connection point 305.

In some embodiments, the wireless connection point 305 includes the processing resource 313 configured to execute instructions stored on a memory resource 309 located on the wireless connection point to generate instructions for the edge device 301 and the device 303 using a machine learning algorithm and based on each piece of the plurality of input data categorized as public data. For example, instructions can be generated for the edge device 301 to increase a running pace of the user of the edge device.

The instructions can be determined using a machine learning algorithm. Using a machine learning algorithm and based on each piece of the plurality of input data categorized as public data, instructions can be determined and provided to the edge device 301 and the device 303. In some examples, the processing resource 313 can be configured to execute instructions stored on the memory resource 309 to selectably determine the instructive action of a first user by comparing the public data of the first user with a second user. For example, public data of the first data can be a general health indicator, such as BMI of the first user. The second processing resource 313 can execute instructions to compare the BMI of the first user with the second user and determine an instructive action (e.g., general workout plan) for the first user In some embodiments, the public data includes a portion of the private data based on a security tag associated with the portion of the private data. For example, a plurality of input of data (e.g., height, weight, BMI, age, etc.) can be received from the edge device 301-1 communicatively coupled to a source 320-1. In this example, the source 320-1 is a sensor communicatively coupled to the edge device 301-1, thus the first piece of input data can be categorized as private data. In some examples, the first piece of the input data can include a security tag. A security tag can be a keyword, terms, or encryption assigned to the piece of information. Based on the type of security tag a portion of the private data (e.g., a height) can be made public and can be shared externally.

In some embodiments, the first processing resource 311 is configured to execute instructions stored on the first memory resource 307 to generate instructions based on the plurality of the input data and predictive action of a user. For example, the instructive action may be predictive based on activities of the user at different time periods. In such instances, the machine learning algorithm executed on the device 301 may determine and generate an instructive action to follow a low intensity workout and/or slow down or stop doing the activity the user is doing at the present time.

In some embodiments, the user receives an alert based on the generated instructions. For instance, the processing resource 311 can instruct the edge device 303 and/or the wireless connection point 305 to generate an alert to the user. The alert can include a quick notice to an unusual and potentially dangerous circumstance. For example, an alert can be sent to the user when the user enters a heartrate zone closer to the maximum heart rate zone for the user's age group (e.g., if the target heartrate zone for a 30-35-year-old user is 93-95 BPM the user can receive an alert when the heartrate reaches 93 BPM In some examples, an alert can include a continuous notice for the user until the user reaches the target and/or below the target value. For example, the user can receive a continuous notice if the user's heartrate reaches 100 BPM.

Figure 4:
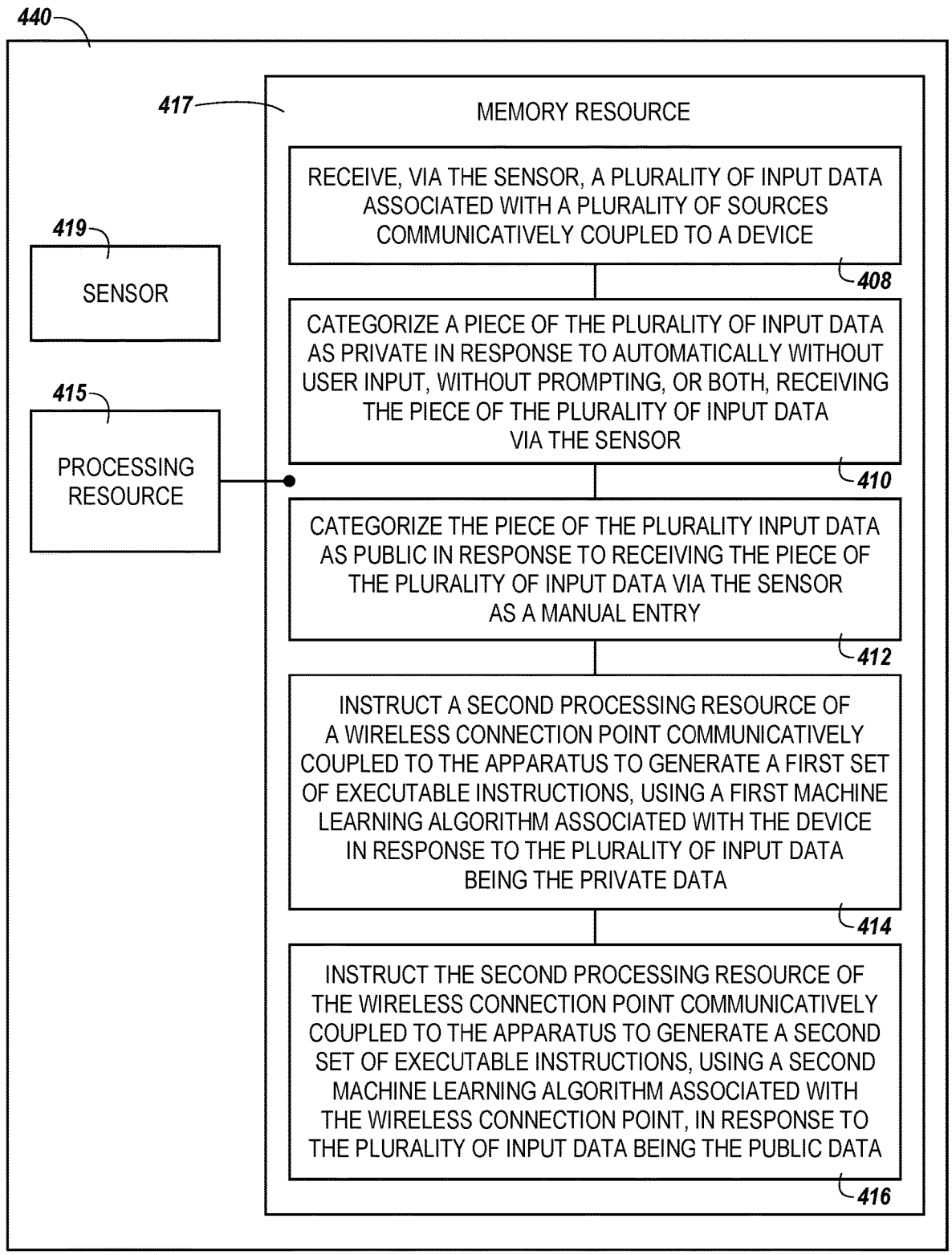
FIG. 4 is a functional diagram representing a processing resource in communication with a memory resource having instructions and written thereon transmitting instructive actions based on categorization of input data as public or private in accordance with a number of embodiments of the present disclosure.

FIG. 4 is a functional diagram representing a processing resource 415 in communication with a memory resource 417 having instructions 408, 410, 412, 414, and 416 written thereon transmitting instructive actions based on categorization of input data as public or private in accordance with a number of embodiments of the present disclosure. FIG. 4 illustrates device 440 (which may also be referred to as an apparatus 440) including the memory resource 417, a sensor 419, and the processing resource 415. In some examples, the device 440 is a server, a computing device, and/or an edge device, such as edge devices 101 and 301 illustrated in FIGS. 1 and 3, respectively.

The memory resource 417 (e.g., a non-transitory MRM), can store instructions, such as instructions 408, 410, 412, 414, and 416. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 417 may be electronic, magnetic, optical, or other physical storage device that stores executable instructions. Thus, the memory resource 417 may be, for example, a non-transitory MRM comprising Random Access Memory (RAM), an Electrically-Erasable Programmable ROM (EEPROM), a storage drive, an optical disc, and the like. The memory resource 417 may be disposed within a controller and/or computing device. In this example, the executable instructions 408, 410, 412, 414, and 416 can be "installed" on the device. Additionally, and/or alternatively, the memory resource 417 can be a portable, external or remote storage medium, for example, that allows the system 440 to download the instructions 408, 410, 412, 414, and 416 from the portable/external/remote storage medium. In this situation, the executable instructions may be part of an "installation package". As described herein, the memory resource 417 can be encoded with executable instructions for transmitting instructive actions based on categorization of input data as public or private in accordance with a number of embodiments of the present disclosure.

The instructions 408, when executed by a processing resource such as the processing resource 415, can include instructions to receive, via the sensor 419, a plurality of input data associated with a plurality of sources communicatively coupled to a device. of sources. The source can include sensors communicatively coupled to an edge device (e.g., the device 440). The source can include manually entered input data, automatically entered input data, or a combination thereof. Each piece of the plurality of input data received can be categorized as private data or public data based on associated one of the plurality of sources.

The instructions 410, when executed by a processing resource such as the processing resource 415, can include instructions to categorize a piece of the plurality of input data as private in response to automatically without user input, without prompting, or both, receiving the piece of the plurality of input data via the sensor 419. For instance, input data categorized as private may include body weight, muscle mass etc., which can be received via a sensor communicatively coupled to an edge device.

The instructions 412, when executed by a processing resource such as the processing resource 415, can include instructions to categorize the piece of the plurality input data as public in response to receiving the piece of the plurality of input data as a manual entry. For instance, input data categorized as public may include a time of day displayed on a user's smart watch and manually entered as input (e.g., via the smart watch, which may be an edge device).

In some embodiments, the processing resource 415 is configured to transmit a portion of the private data to a processing resource of a wireless connection point to compare the portion of the private data with the public data. For example, a portion of the private data can be tagged with a security tag. A security tag can be a keyword, terms, or encryption assigned to the piece of information. Based on the type of security tag a portion (e.g., height) of the private data can be made public and can be shared externally.

The instructions 414, when executed by a processing resource such as the processing resource 415, can include instructions to instruct a different processing resource of a wireless connection point communicatively coupled to the device 440 to generate a first set of instructive actions using a first machine learning algorithm associated with the device in response to the plurality of input data being the private data.

In some example, the processing resource 415 is configured to execute instructions to perform a query by the device to determine predictive behavior using a machine learning algorithm. For example, based on received input data regarding the user's running history and running gear purchase pattern, a predictive behavior can be determined for the user's future purchases.

In some embodiments, the processing resource 415 is configured to transmit a portion of the private data to a processing resource of a wireless connection point to compare the portion of the private data with the public data. For example, a portion of the private data can be tagged with a security tag. Based on the type of security tag, a portion of the private data (e.g., a height) can be made public and can be shared externally.

In some embodiments, the processing resource 415 is configured to execute instructions to generate a specific instructive action based on the performed query by the device using the first machine learning algorithm. Specific instruction can include tailored instruction based on input received input data. For instance, a specific instruction can include alerting a user to consume electrolyte drinks at certain time interval while doing a long-distance race based on manually received input data.

In some embodiments, the processing resource 415 is configured to execute instructions to generate a general instructive instruction based on the portion of the private data. For example, the wireless connection point can receive a portion of the private data. The wireless connection point can generate a general instructive instruction to the wireless connection point can. For example, the public data about a user can include manually entered health input data about a user. A portion of the manually entered input data, however, may be tagged as private data (example, BMI, weight, age, etc.). A general instructive instruction can be generated, for example a generic workout plan, based on the portion of the private data.

The instructions 416, when executed by a processing resource such as the processing resource 415, can include instructions to instruct the different processing resource of the wireless connection point communicatively coupled to the device 440 generate a second instruction, using a second machine learning algorithm associated with a wireless connection point, in response to the plurality of input data being the public data. For example, the public data can be transmitted to the wireless connection point. The wireless connection point can, using a machine learning algorithm, analyze, compare, predict, and to generate executable instructions for the device. In some examples, the wireless connection point can use the first machine learning algorithm to generate and transmit instructive actions for the edge device to alert/notify a user.

In some embodiments, the processing resource is configured to execute instructions to generate the general instructive action by comparing the portion of the private data with the public data using the second machine learning algorithm associated with the wireless connection point. In some examples, the processing resource is configured to execute instructions to generate a specific instructive action by comparing the portion of the private data with the public data using the second machine learning algorithm in the wireless connection point.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
  receiving, from an edge device and at a processing resource of another device, a plurality of input data associated with a plurality of sources communicatively coupled to the edge device;
  writing each piece of the plurality of input data in a secured mode via a secured path to a memory resource;
  utilizing the plurality of input data to determine a source of each piece of the plurality of input data, perform artificial intelligence operations, and categorize each piece of the plurality of input data as private or public based on the input data associated with each one of the plurality of sources;
  writing, in a secured mode via a secured path, each piece of the plurality of input data categorized as private to a dedicated buffer or a dedicated address space of the memory resource; and
  writing each piece of the plurality of input data categorized as public to a different, non-secured mode portion of the memory device.

2. The method of claim 1, further comprising:
  receiving a first piece of the plurality of input data automatically without user input, without prompting, or both from a sensor communicatively coupled to the edge device; and
  categorizing the first piece of the plurality of input data as private data based on the automatically receiving.

3. The method of claim 2, further comprising:
  generating executable instructions for the device based on the categorizations as the private data; and transmitting an instructive action to the edge device based on the private data received.

4. The method of claim 1, further comprising:
receiving a first piece of the plurality of input data as manually entered input data; and
categorizing the first piece of the plurality of input data as public data based on the manually entered receiving.

5. The method of claim 1, wherein the categorizing comprises writing each piece of data with metadata that indicates that it is private or public.

6. The method of claim 1, wherein the public data is operated upon using a machine learning algorithm stored in the memory resource and accessed by the processing resource to determine an instructive action to be transmitted to the edge device during a present time period.

7. The method of claim 6, further comprising determining, using the machine learning algorithm, the instructive action to be transmitted by comparing the plurality of input data received during the present time period with a time period other than the present time period.

8. A device, comprising:
a first memory resource;
a second memory resource; and
a first processing resource communicatively coupled to the first and the second memory resources and configured to:
receive a plurality of input data from an edge device associated with a plurality of sources communicatively coupled to the edge device;
write each piece of the plurality of input data in a secured mode via a secured path to the first memory resource;
utilize the plurality of input data to determine a source of each piece of the plurality of input data, perform artificial intelligence operations, and categorize each piece of the plurality of input data as private or public based on the input data associated with one of the plurality of sources;
store each piece of the plurality of input data categorized as private to the first memory resource;
store each piece of the plurality of input data categorized as public to the second memory resource; and
transmit to a second processing resource of a wireless connection point, at least a portion of the plurality of input data and metadata associated therewith.

9. The device of claim 8, wherein the public data includes a portion of the private data based on a security tag associated with the portion of the private data.

10. The device of claim 8, wherein the first processing resource is configured to execute instructions stored on the first memory resource to generate instructions based on the plurality of the input data and predictive action of a user.

11. The device of claim 10, wherein the first processing resource is configured to execute instructions stored on the first memory resource to selectably determine the predictive action of the user by comparing the private data in a current time with input data received at different periods in time.

12. The device of claim 8, further comprising the first processing resource to categorize the plurality of data by writing each piece of data with metadata that indicates that it is private or public.

13. The device of claim 8, wherein the private data includes a piece of the plurality of the input data received automatically without user input, without prompting, or both via a sensor communicatively coupled to the edge device.

14. The system of claim 8, wherein the public data includes a piece of the plurality of the input data manually entered.

15. A device, comprising:
a sensor;
a first processing resource; and
a memory resource communicatively coupled to the first processing resource comprising instructions that, when executed by the processor cause the device to:
receive, via the sensor, a plurality of input data associated with a plurality of sources communicatively coupled to the device;
write each piece of the plurality of input data in a secured mode via a secured path to the memory resource;
utilize the plurality of input data to determine a source of each piece of the plurality of input data, perform artificial intelligence operations, and categorize a first piece of the plurality of input data as private in response to automatically without user input, without prompting, or both, receiving the piece of the plurality of input data via the sensor;
categorize a second piece of the plurality input data as public in response to receiving the piece of the plurality of input data via the sensor as a manual entry;
instruct a second processing resource of a wireless connection point communicatively coupled to the device to generate a first set of executable instructions, using a first machine learning algorithm associated with the device in response to the first piece of the plurality of input data being the private data;
write, in a secured mode via a secured path, each piece of the plurality of input data categorized as private to a dedicated buffer or a dedicated address space of the memory resource;
instruct the second processing resource of the wireless connection point communicatively coupled to the device to generate a second set of executable instructions, using a second machine learning algorithm associated with the wireless connection point, in response to the second piece of the plurality of input data being the public data; and
write each piece of the plurality of input data categorized as public to a different, non-secured mode portion of the memory device.

16. The device of claim 15, wherein the first processing resource is configured to execute instructions to transmit a portion of the private data to the second processing resource of the wireless connection point to compare the portion of the private data with the public data.

17. The device of claim 16, wherein the first processing resource is configured to execute instructions to generate a general instructive instruction based on the portion of the private data.

18. The device of claim 17, wherein the first processing resource is configured to execute instructions to generate the general instructive action by comparing the portion of the private data with the public data using the second machine learning algorithm associated with the wireless connection point.

19. The device of claim 15, wherein the first processing resource is configured to execute instructions to perform a query by the device to determine predictive behavior using the first machine learning algorithm.

20. The device of claim 19, wherein the first processing resource is configured to execute instructions to generate a specific instructive action based on the performed query by the device using the first machine learning algorithm.

* * * * *